Patented Nov. 11, 1930

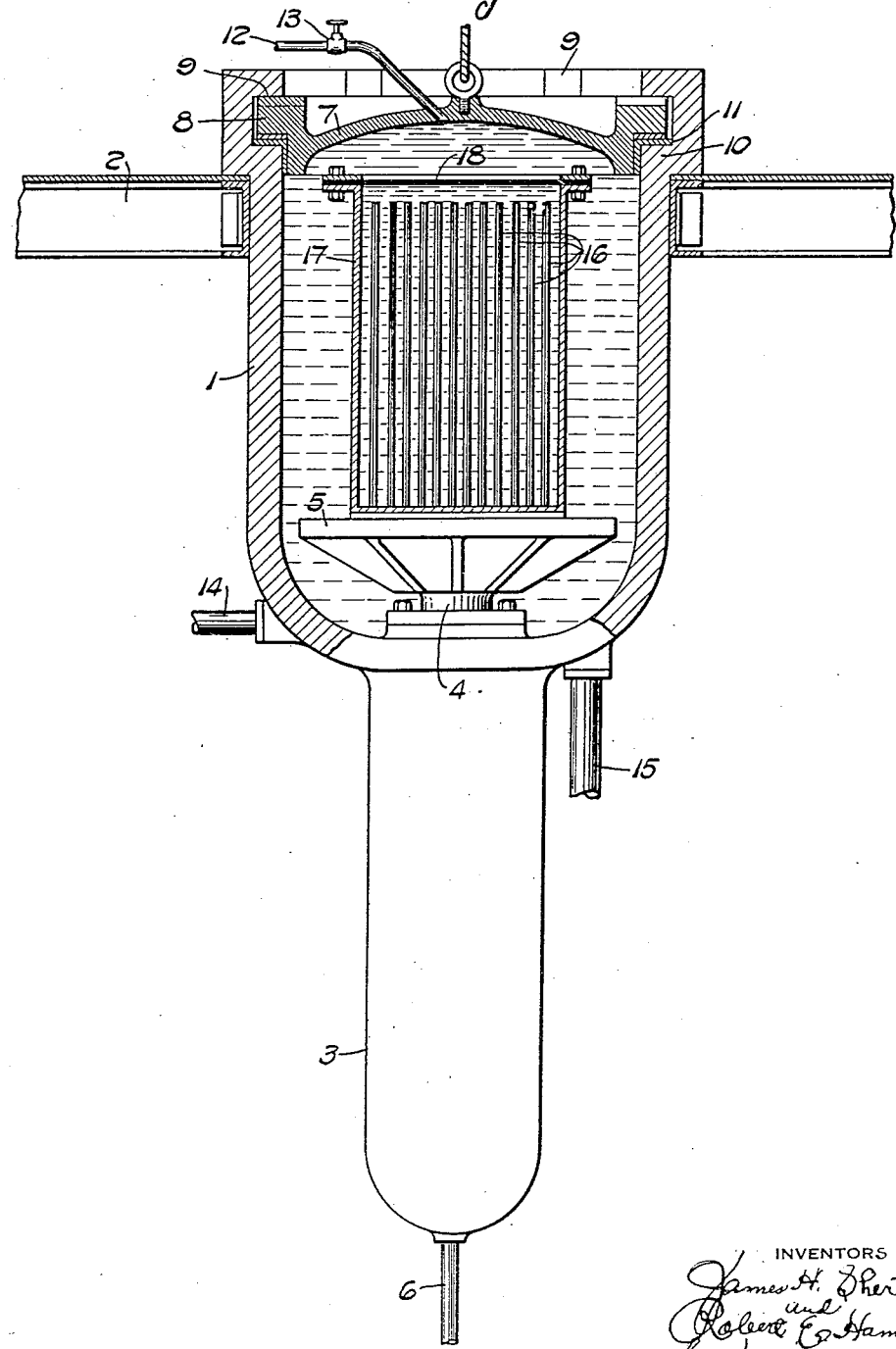

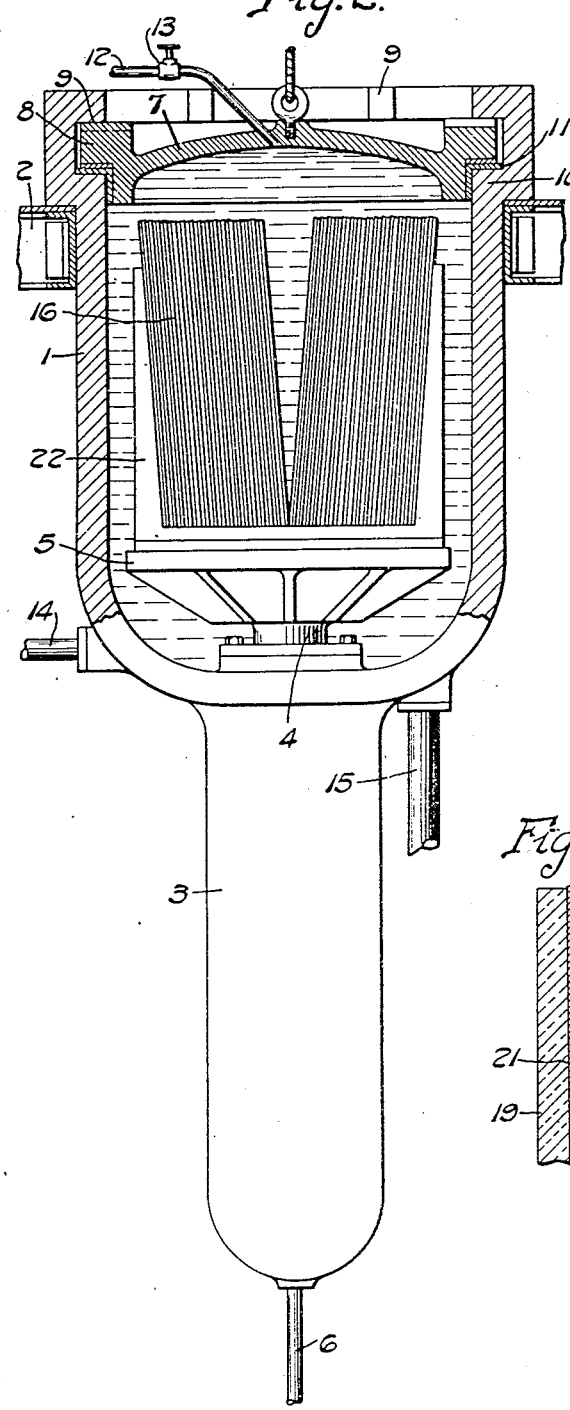
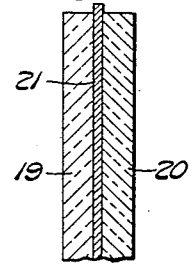
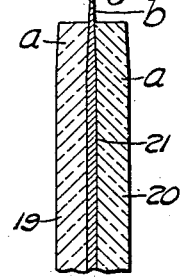
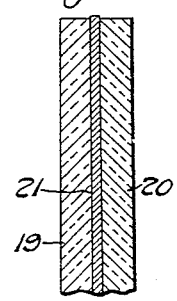
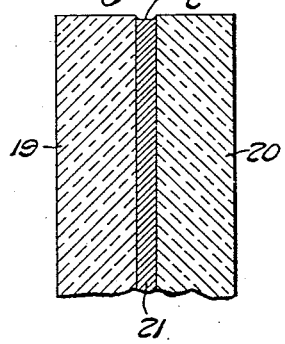

1,781,084

UNITED STATES PATENT OFFICE

JAMES H. SHERTS, OF BRACKENRIDGE, AND ROBERT E. HAMILL, OF TARENTUM, PENNSYLVANIA, ASSIGNORS TO DUPLATE CORPORATION, A CORPORATION OF DELAWARE

PROCESS FOR MAKING LAMINATED GLASS

Application filed October 18, 1929. Serial No. 400,682.

The invention relates to a process for treating composite glass plates made up of alternating sheets of pyroxylin plastic and glass, usually two sheets of glass with an interposed sheet of celluloid or cellulose acetate secured to the glass by means of gelatin or other suitable cement. While gelatin is the cement preferred, it will be understood that the term "cement" is used in its broad sense and applies to any adhesive including that formed by softening the surface of the celluloid with a solvent, as is well known. The application constitutes in part a continuation of our application, Serial No. 353,720, filed April 9, 1929. Glass of the kind specified is composited under heat and pressure, one well-known method comprising the steps of placing the assembled sheets in a rubber bag and exposing it in a pressure chamber to a pressure of about 150 pounds per square inch and a temperature of about 250 degrees F. Glass so composited tends to develop an edge condition such as that illustrated in exaggerated form in Fig. 4, in which the celluloid is thinned and squeezed out and the glass bent slightly. This condition may later result in a separation at the edge due to the tendency of the bent glass to pull away from the celluloid. It may also result in the formation of slight cracks or lines in the glass running back from the edge a short distance and referred to as vents. The protruding celluloid edge also makes the final grinding of the composite plate much more difficult. Even where the condition indicated in Fig. 4 does not exist, separation may sometimes occur due to a loss of solvent and of camphor from the celluloid, which results in a shrinkage of the edge of the celluloid sheet. The object of the present invention is to provide a treatment which will overcome all of these difficulties. Briefly stated, this consists in its preferred form in exposing the edges of the composite plates to a relatively non-volatile liquid (preferably a solvent of the plastic) under pressure or heat and pressure. This treatment applied to plates, which have developed edge separation, results in their elimination, due undoubtedly to the forcing in of the plastic after it is softened by the heat and to the swelling of the plastic as it absorbs the solvent. Preferably, however, the treatment is applied to all of the plates as soon as they are made, or during the process of making, thus preventing the development of any edge defects, either in the form of the vents or in the form of edge separations. Due to the action of the liquid under heat and pressure, the plastic at the edge of the plate is softened and forced inward between the glass sheets, thus permitting the edges of the glass sheets to straighten and eliminating any tendency to future separation. The saturation of the edges of the plastic sheet with the non-volatile solvent or plasticizer, or with any suitable liquid either miscible or not miscible with water, also prevents any subsequent shrinkage of the plastic incident to the loss of its normal solvent, as heretofore referred to.

While the invention is described as applied to plates composited by the rubber bag process, it will be understood that the process can be applied advantageously to glass composited by any known process, such as those in which platens or diaphragms are employed to apply the pressure, as in all cases there is at least a slight tendency to thin the plastic at the edges which results in separations at such edges when the glass edges straighten, or when the solvent or plasticizer in the plastic drys out, or when such plastic absorbs and discharges moisture. It is now the practice in order to overcome this tendency, to scrape out the plastic and fill the groove with sealing material, which requirement can be entirely avoided by the use of the present process.

Certain forms of apparatus for conveniently practicing the process are shown in the accompanying drawings, wherein:

Figure 1 is a partial side elevation and partial section through one form of apparatus. Fig. 2 is a view similar to that of Fig. 1 of a modification. Fig. 3 is an enlarged section through the edge of an assembled set of sheets before pressing. Fig. 4 is a section similar to that of Fig. 2 after the pressing operation, the thinning of the celluloid and the bending of the edges of the glass sheets being exaggerated. Fig. 5 is a view similar to that of Figs. 3 and 4 after the sheet has been subjected to the process constituting the present invention. And Fig. 6 is a section similar to that of Fig. 5 on a larger scale and showing an effect which may be secured in the practice of the invention.

Referring to the drawings, 1 is a pressure chamber preferably supported in the floor 2, as indicated in Fig. 1, and having at its lower end an extension 3 carrying a plunger 4 whose upper end supports a table 5. A pipe 6 connected to the lower end of the extension 3 serves to supply liquid under pressure for raising the plunger. The chamber is closed by means of the cover 7 provided with locking lugs 8. Lying above the locking lugs are opposing lugs 9 carried by the upper end of the chamber 1. The opposing faces of the two sets of lugs are inclined so that when the cover is inserted to the position shown and rotated so as to bring the lugs 8 beneath the lugs 9, the engagement of the cam surfaces forces the cover down tightly against the shoulder 10, a suitable gasket 11 being provided in order to make a tight joint. The cover is provided with an outlet pipe 12 to permit the escape of air when the chamber is filled with water, a valve 13 being provided to close the pipe during the pressing operation, later described. The chamber is provided with an inlet pipe 14 and an outlet pipe 15.

The plates 16 to be treated are preferably placed in a sheet metal container 17 which is closed at the upper end by a rubber sheet 18 and the container is completely filled with a non-volatile solvent of pyroxylin plastic, such as di ethylene glycol mono ethyl ether, or with some other liquid which will make the edges of the plastic sheet impervious to water when such liquid is driven into the edges of such sheet under pressure as later described.

In carrying out the operation, the cover 7 is removed and the plunger 4 is moved up so that the table 5 lies adjacent the top of the pressure chamber. The container 17 with the plates 16 therein, composited as heretofore described, is placed upon the table 5 and the remaining space in the container filled with the di ethylene glycol mono ethyl ether, the cover plate 18 of rubber then being applied. The plunger 4 is now lowered to the position shown in Fig. 1 and the cover 7 is applied. The pressure chamber is now filled with hot water, such water being heated by any suitable means and circulated through the chamber by means of the pipes 14 and 15 until the di ethylene glycol mono ethyl ether in the container 17 arrives at a temperature of about 250 degrees F. At this time the pressure in the container 1 is increased to about 150 pounds per square inch. This pressure is transmitted to the liquid inside the container 17 due to the use of the flexible top or cover 18. It is now necessary to cool the contents of the containers 1 and 17 and this is accomplished by circulating water which is lowered in temperature through the pipes 14 and 15, the pressure being maintained in the container 1 during this cooling operation. When the water in the chamber 1 reaches a temperature of about 140 degrees F., the pressure is released and the circulation discontinued. The cover 7 is now removed and the table 5 is raised lifting the container 17 from the chamber so that its contents may be conveniently removed, thus completing the operation.

Figs. 3, 4 and 5 illustrate the edges of a composite plate under the pressing and treating conditions. In these figures, 19 and 20 are the glass sheets and 21 is the pyroxylin plastic which is to be cemented to the glass sheets, and which is ordinarily slightly larger than the glass plates so that its edges project out beyond those of the glass plates, as indicated in Fig. 3. During the compositing action these sheets are exposed to heat and pressure, and as heretofore explained, the tendency is to thin the pyroxylin plastic at its edges, due to the fact that the edges of the glass sheet are sprung in, as indicated (in an exaggerated degree) at $a, a$ in Fig. 4, squeezing out the plastic as indicated at $b$. This is the condition of the plate when it is placed in the container 17 for the solvent treatment. During this treatment, the plastic is softened which permits the edges $a, a$ to straighten out, as indicated in Fig. 5, the pressure in the chambers 1 and 17 forcing this plastic edge $b$ into the increased space thus provided. The solvent is also absorbed in the edge of the plastic, or driven into such edge by the pressure, so that this edge for a short distance back between the edges of the glass sheets is saturated, thus increasing the volume of the plastic slightly. As a result of this saturation of the plastic by the solvent, any subsequent drying out and shrinking of the plastic is prevented since the solvent used is substantially non-volatile. The treatment, therefore, insures that there will be no subsequent separation between the plastic and glass when a liquid is employed for pressing which is not miscible with water. Even when the condition as to the thinned plastic edge illustrated in Fig. 4 does not exist, as in the case of a plate having its edges cut off, or exists only in a slight degree, the treatment is still valuable for the reason above indicated, namely, that the liquid which is absorbed by the edge of the plastic, or forced into the edge, prevents any shrinkage of such edge and eliminates any danger of future separation due to this cause, thus eliminating the requirement for sealing which has been heretofore regarded as necessary. This sealing is laborious and expensive and consists in scraping out some of the plastic and filling the groove thus formed with pitch or some other suitable sealing material to keep the solvent or plasticizer from escaping from the plastic. The absorption of the treating liquid by the edges of the pyroxylin plastic apparently has no effect upon the holding qualities of the gelatin or other adhesive used as a cement, the attachment of the plastic to the glass being just as secure after the treatment as before. While the protruding edge of the plastic is disposed of primarily by the pressure forcing it between the glass plates, the solvent action of the di ethylene glycol mono ethyl ether (when such liquid is used as the pressing fluid) assists by dissolving a part of such edge.

Fig. 6 shows an effect which may be secured by the solvent treatment, as heretofore described, when the plastic sheet is trimmed off even with the edges of the glass sheets before the pressure treatment. During the pressure treatment the plastic is forced in, providing the groove c, which may be subsequently filled with a sealing material, such as pitch or varnish, if desired.

Fig. 2 shows a modified form of apparatus for carrying out the treating process wherein the container 17 of Fig. 1 is eliminated and the plates 16 are carried in a rack 22 mounted upon the platform 5 so that the plates are exposed directly to the liquid in the chamber 1. In other respects, this apparatus is the same as that of Fig. 1 and similar numerals are used to designate corresponding parts. After the usual compositing operation, the plates 16 are positioned in the chamber 1, as indicated and the chamber is filled with solvent or other suitable liquid at a temperature of about 250 degrees F. and under a pressure of about 150 pounds per square inch. Suitable means are provided for circulating the solvent, so that after the pressing operation, the temperature in the tank is gradually reduced, after which the pressure is released, the chamber 1 is opened by removing the cover 7, and the plunger is moved up to carry the rack out of the chamber and permit the plates to drain. The result secured with this apparatus is precisely the same as that secured in the apparatus of Fig. 1. The original compositing may, if desired, be also carried out in an apparatus similar to that shown in Fig. 2 placed adjacent the treating apparatus, so that after the compositing action the plates are quickly transferred to the treating apparatus. The method of compositing is, however, immaterial insofar as the present invention is concerned as the treatment by the non-volatile solvent under heat and pressure has the same advantage to a greater or lesser degree, regardless of the method of compositing, being particularly valuable, however, in the treatment of plates composited by any method in which the tendency to bend in the edges of the glass sheets and thin the plastic, as indicated in Fig. 4, is present. With such glass, as heretofore pointed out, the tendency to separate at the edges and straighten out, is greater than in the case of a composite plate in which the plastic at the edges is not thinned and squeezed out by the bending in of the glass edges.

The solvent di ethylene glycol mono ethyl ether referred to herein is formed by heating ethyl alcohol and ethylene oxide under pressure in an autoclave until reduced to a mixture containing ethyl alcohol, ethylene glycol mono ethyl ether, di ethylene glycol mono ethyl ether, and a little glycol. The mixture is stilled to remove the alcohol and the ethylene glycol mono ethyl ether, leaving only the di ethylene glycol mono ethyl ether and glycol which are then separated by further distillation.

Some of the other high boiling, relatively non-volatile pyroxylin plastic solvents or plasticizers, which may be used in place of the diethylene glycol mono ethyl ether are tricresyl phosphate, dibutyl phthalate, triphenyl phosphate, dimethyl phtalate, cyclo hexanol, amyl acetate, dichlor-ethyl ether, zylol, diethyl palmitate, diethyl ether, dichlor-ethyl ether, etc., or mixtures of these solvents. It is also possible to use, in place of these solvents or plasticizers, paraffin, castor oil, glycerin, linseed oil, solar oil, mercury and some other compounds, which are not solvents of the plastic, although a solvent is preferred and in fact required to eliminate separation which has already developed. When liquids are used, which are volatile, there is no assurance that the edge separations will not occur in the course of time due to the loss of the liquid from the plastic and a shrinkage of the plastic due to such cause. The heat and pressure conditions employed in the treatment are preferably substantially the same when a non-solvent is used as is the case in the treatment with a solvent. The pyroxylin plastic is relatively soft at a temperature of from 212 to 230 degrees F., but for the purpose of shortening the cycle, it is desirable to heat the solvent or other solution to a temperature of approximately 250 degrees F. and hold it there upwards of five minutes to permit of the penetration of the necessary amount of heat to the plastic. A convenient pressure for securing the desired results is 150 pounds per square inch and such pressure may be applied before the plastic reaches the maximum temperature or during such time, the essential being that the pressure be applied when the plastic is soft enough to be forced back between the glass sheets.

In repairing sheets in which edge separation has occurred, it is necessary to use one of the non-volatile solvents, the use of a non-solvent being of no value in a case of this kind since the mere forcing of the plastic edge back between the glass sheets will not cause a union at the points of separation. The solvents will on the other hand give the desired result, since they function by being absorbed by the plastic causing it to swell tightly against the glass and at the same time colloid the surface of the plastic sufficient to make a cement which adheres to the glass. After the plastic and the glass have been recemented together, they do not tend to separate, as the solvent is relatively non-volatile and there is, therefore, relatively no evaporation with consequent shrinkage.

The process may be practiced to advantage on composite plates, even where the process of compositing has been such that there is little or no edge strain in the plate, and little or no protrusion of the edges of the plastic sheet beyond the edges of the glass sheets, as for instance, in plates composited in rigid platen presses instead of in rubber bags, or in plates preliminarily composited in rubber bags under relatively light pressure as the first stage of a double pressing operation. In such plates separation may occur due to absorption of moisture from the atmosphere or other medium in which the plate may be used, or due to a loss of solvent from the edges of the plastic, causing it to shrink. This action is prevented by applying a liquid or solution under pressure alone or under both heat and pressure, as heretofore described sufficient to force some of the liquid into the edges of the plastic, with a view to making it impervious to moisture and preventing subsequent shrinkage. Di ethylene glycol mono ethyl ether, as heretofore explained, meets the requirement but does have the property of mixing readily with water, so that plastic edges impregnated with this solvent may, when exposed to very unfavorable moisture conditions, absorb sufficient moisture to cause a separation. It is, therefore, preferred where unfavorable moisture conditions are encountered to use a liquid which has, in addition to the desirable qualities of the di ethylene glycol mono ethyl ether (relatively non-volatile, high boiling point, plasticizing or solvent action or pyroxylin plastic) the further quality of being repellant to or non-miscible with water, so as to insure against the absorption of any moisture by the edges of the plastic sheets. Among the liquids having this quality, in addition to the desirable ones recited for the di ethylene glycol mono ethyl ether are the following: dichlorethyl ether, zylol, diethyl ether, dimethyl phthalate, tricresyl phosphate, dibutyl phthalate, triphenyl phosphate, cyclo hexanol, amyl acetate and diethyl palmitate. Among the compounds enumerated, the compounds most satisfactory from all standpoints are the dichlorethyl ether and dibutyl phthalate. The one disadvantage incident to using a liquid which is non-miscible with water is the difficulty in cleaning off such liquid after the operation is completed.

While the process is preferably practiced with the application of heat in order to soften the pyralin plastic, for the reasons heretofore explained, the use of heat is not an essential in those cases in which there is no edge strain, either due to the process of compositing or to the fact that the edges of the sheets have been trimmed off after the compositing action. In such cases all that is necessary is to apply the treating liquid to the edges of the plates under pressure, as such pressure will cause the plastic to become sufficiently impregnated without the application of heat, and the edges will thus be permanently sealed against the absorption of moisture by the plastic or against loss of the original solvent of the plastic. The treatment under these conditions is preferably applied after the edges have been ground and polished.

What we claim is:

1. A process of treating a laminated plate made up of alternating sheets of glass and cellulose plastic having their opposing surfaces secured together so as to seal the joint at the edges of the sheets, which consists in heating the edges of the plate so as to soften the plastic and applying fluid under pressure in direct contact with the edges of the plate so as to force the edges of the plastic inward.

2. A process of treating a laminated plate made up of alternating sheets of glass and cellulose plastic having their opposing surfaces secured rigidly and solidly together, which consists in exposing the edges of the plate in direct contact with a liquid heated to a temperature such as to soften the plastic and applying pressure through such liquid so as to force the edges of the plastic inward.

3. A process of treating a laminated plate made up of alternating sheets of glass and cellulose plastic having their opposing surfaces secured rigidly and solidly together, which consists in submerging the plate in a bath of pyroxylin plastic solvent in direct contact with said plate throughout, raising the temperature of the bath to a point at which the plastic is softened and applying pressure to the bath.

4. A process of treating a laminated plate made up of alternating sheets of glass and plastic having their opposing surfaces secured together so as to seal the joints at the edges of the sheets, which consists in exposing the plate to the liquid of a bath having direct contact with the surfaces thereof and a temperature such as to soften the plastic and applying pressure to the bath.

5. A process of compositing glass and reinforcing sheets, which consists in preliminarily cementing such sheets rigidly together so as to seal the joints at the edges of the sheets, and then exposing the plate thus formed to heated fluid under pressure so that such fluid contacts directly with the surfaces of the plate.

6. A process of compositing glass and plastic reinforcing sheets which consists in preliminarily cementing such sheets immovably together so as to seal the joints at the edges of the sheets, and then exposing the plate thus formed in a bath of solvent for the plastic contacting directly with the surface of the plate having a temperature sufficient to soften the plastic and under pressure in such manner that the solvent contacts directly with the surfaces of the plate throughout.

7. A process of compositing glass and pyroxylin plastic reinforcing sheets which consists in preliminarily cementing such sheets rigidly and solidly together, and then submerging the composite plate thus formed in a bath of high boiling pyroxylin plastic solvent under heat and pressure, in such manner that the liquid contacts directly with the surfaces of the plate throughout.

8. A process of compositing glass and reinforcing sheets which consists in cementing the sheets rigidly and immovably together under heat and pressure, and then exposing the plate to a heated fluid under pressure which contacts directly with the surfaces of the plate throughout including the joints at the edges of such plate.

In testimony whereof, we have hereunto subscribed our names.

JAMES H. SHERTS.
ROBERT E. HAMILL.